United States Patent [19]

Konno

[11] 3,894,188

[45] July 8, 1975

[54] REMOTE CONTROL DEVICE FOR AN AUTOMATIC TELEPHONE ANSWERING APPARATUS

[75] Inventor: Akira Konno, Tokyo, Japan

[73] Assignee: Pioneer Electronic Corporation, Tokyo, Japan

[22] Filed: Jan. 16, 1974

[21] Appl. No.: 433,636

Related U.S. Application Data

[63] Continuation of Ser. Nos. 213,616, Dec. 29, 1971, abandoned, and Ser. No. 247,648, April 26, 1972, abandoned.

[30] Foreign Application Priority Data

Dec. 30, 1970 Japan .......... 45-127693
Apr. 30, 1971 Japan .......... 46-29312

[52] U.S. Cl. .......... 179/6 E
[51] Int. Cl. .......... H04m 1/64
[58] Field of Search .......... 179/6 E, 6 R, 6 AC, 2 A, 179/100.1 DR; 360/72, 74

[56] References Cited

UNITED STATES PATENTS 3,067,289 12/1962 Zimmermann .......... 179/6 E
3,136,856 6/1964 Zimmermann .......... 179/6 E
3,673,332 6/1972 Muller et al. .......... 179/6 E

*Primary Examiner*—Raymond F. Cardillo, Jr.
*Attorney, Agent, or Firm*—Sughrue, Rothwell, Mion, Zinn & Macpeak

[57] ABSTRACT

An automatic telephone answering apparatus receives messages from callers and records the messages sequentially on a recording tape. The subscriber or owner of the apparatus may call in and initiate a message playback sequence by transmitting a special remote signal to the apparatus. The apparatus includes a remote control signal detecting circuit which detects a predetermined remote control signal and operates in response thereto, and a mechanical tape length counter for counting the length of an incoming message recording tape. The tape length counter includes a contact which is switched in response to the operation of the remote control signal detecting circuit. Apparatus is provided for storing the position of the tape at the end of the last received message and for storing the position of the tape at the time of the previously received remote signal. When the remote signal is received, the present position of the tape is stored and the tape is rewound to a position corresponding to the position of the tape at the receipt of the last remote signal. When the tape reaches the latter position, it begins to play back and reproduce for the owner or subscriber all of the messages recorded subsequent to the last received remote signal. The playback and reproducing sequence terminates when the tape moves forward to the position corresponding to the end of the last recorded message.

14 Claims, 5 Drawing Figures

REMOTE CONTROL DEVICE FOR AN AUTOMATIC TELEPHONE ANSWERING APPARATUS

CROSS-REFERENCE TO RELATED APPLICATIONS

This application is a continuation of application Ser. No. 213,616, filed Dec. 29, 1971, now abandoned, entitled REMOTE CONTROL DEVICE FOR AN AUTOMATIC TELEPHONE ANSWERING APPARATUS, and application Ser. No. 247,648, filed Apr. 26, 1972, now abandoned, entitled REMOTE CONTROL DEVICE FOR AN AUTOMATIC TELEPHONE ANSWERING APPARATUS.

BACKGROUND OF THE INVENTION

1. Field of the Invention

This invention pertains generally to a remote control device for an automatic telephone answering apparatus, and, more particularly, to an improved remote control device whereby a specific calling party, subscriber or owner of the apparatus can listen at a remote location to a previously recorded incoming message previously received from a calling party.

2. Description of the Prior Art

Known automatic telephone answering apparatus with a remote control device are broadly divisible into two types, as will be described below.

The first type apparatus has been generally constructed as follows. An incoming message signal recording tape for recording an incoming message from a calling party has two tracks thereon; that is, an incoming message from a calling party is recorded on the first track and a control signal is recorded on the second track. The apparatus is held in a recording operation state for a fixed time for recording the incoming message, even if the incoming message is intermittent. When the specific calling party or owner sends out the remote control signal to his apparatus through a telephone circuit, the incoming message recording tape is rewound and then the recorded incoming messages are reproduced and sent out from the beginning of the tape. During the reproducing period, the apparatus is retained in the operating state by making use of the control signal already recorded on the second track of the incoming message recording tape. Therefore, the apparatus returns to the standby state to wait for the next calling signal after all of the recorded incoming messages have been reproduced and sent out, that is, after all of the recorded control signal has been reproduced.

The second type apparatus has been generally constructed as follows. An incoming message recording tape for recording incoming messages from calling parties has one track only for recording the incoming messages. Under the remote control, when the specific calling party or owner sends out a predetermined remote control signal through a telephone circuit, the apparatus is changed into the recording state for recording an incoming message and the remote control signal is recorded on the incoming message recording tape as an incoming message. At the same time, the remote control signal is applied to a filter circuit. The apparatus is then switched to a rewinding state by the output of the filter circuit, and the recorded incoming messages on the rewound tape are reproduced from the beginning of the tape. After all of the recorded incoming messages have been reproduced, the recorded remote control signal is reproduced continuously. The reproduced remote control signal is fed to a filter circuit causing the apparatus to return to the standby state to wait for the next calling signal.

The above-mentioned first type apparatus has the disadvantage of requiring an oscillating circuit for producing the control signal to be recorded on the second track, and it requires the use of an exclusive track for recording the control signal during the incoming message recording period.

On the other hand, the second type apparatus does not require the exclusive track to record the control signal, but does require two filter circuits. One circuit functions to pass only the predetermined remote control signal, or the specific frequency signal to rewind the incoming message recorded tape, while the other circuit passes only the specific frequency component of the recorded remote control signal to return the apparatus to the standby state. Further, when the running speed of the incoming message recording tape is changed, the frequency of the reproduced remote control signal changes from the original frequency. Consequently, the reproduced remote control signal cannot pass through the filter and the apparatus is not returned to the standby state. An automatic telephone answering apparatus is primarily used while the subscriber of the apparatus is absent. Therefore, it is very dangerous if the apparatus is not returned to the standby state, because the communication circuit of the telephone is needlessly monopolized. When designing a pass band for the filter, if the band is widened to overcome the alternation of the reproduced frequency, the discrimination of the remote control device for the message and the remote control signal is degraded. This causes the apparatus to be returned to the standby state during the reproducing of an incoming message.

One of the problems in the prior art is that the remote signal initiated a playback sequence which played back all of the messages recorded on the tape, many of which may already have been heard by the owner or subscriber in response to a prior remote signal. Specifically, the remote signal caused the tape to rewind to its start position and then begins playing back all messages recorded on the tape, including those previously listened to by the owner or subscriber.

SUMMARY OF THE INVENTION

It is a primary object of this invention to provide an improved remote control device suitable for an automatic telephone answering apparatus, which device includes a remote control signal detecting circuit, a mechanical tape length counter for counting the length of an incoming message recorded tape, and a switch operated by the remote control signal detecting circuit. Thus, the device is simple in construction and reliable in operation.

It is another object of this invention to provide a remote control device, suitable for an automatic telephone answering apparatus, which begins a remote controlled operation by receiving a predetermined remote control signal from a specific calling party. The device first rewinds an incoming message recording tape, then reproduces and sends out incoming messages previously recorded on the recording tape. The device returns to the standby state at the same position at which the rewinding began when all of the previously recorded incoming message signals have been reproduced and sent out.

In accordance with one embodiment of the present invention, the automatic telephone answering apparatus includes means for initiating limited playback of recorded messages in response to a remote signal, preferably transmitted via the telephone line, from the owner or subscriber. In response to the remote signal, the playback apparatus reproduces only those messages which have been stored subsequent to the previous playback sequence initiated by a previous remote signal. In this manner, the owner or subscriber listens only to those messages which he has not previously heard. The apparatus includes a pair of memory means, one of which is adapted to store the present position of the tape (referred to as the end of last message position) when a remote signal is received, the other of which is adapted to store the prior position of the tape at the termination of the prior playback sequence (referred to as the previous remote signal position of the tape). When the remote signal is received, the first storage means is reset to store the present position of the tape and the tape is rewound until it reaches a position corresponding to that stored in the second storage means. That position is the last remote signal position of the tape. The tape then commences forward movement and reproduction of the messages is accomplished while the tape is moving forward. When the tape reaches a position corresponding to that stored in the first storage means, the playback operation is terminated. Also, the second storage means is reset at this time to store the position corresponding to the end of the present playback.

BRIEF DESCRIPTION OF THE DRAWINGS

Other objects, features and advantages of the present invention will be apparent from the following detailed description taken in connection with the accompanying drawing wherein.

DESCRIPTION OF THE PREFERRED EMBODIMENT

Figure 1A:
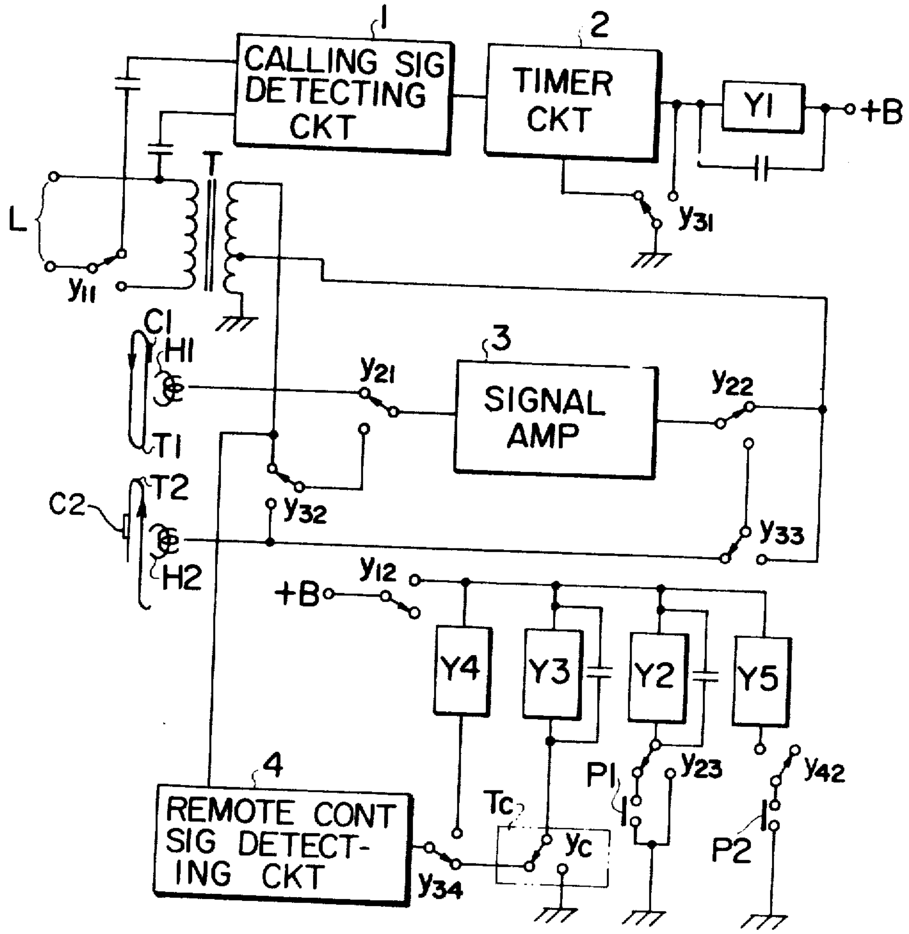
FIGS. 1*a* and 1*b* are an automatic telephone answering apparatus with the remote control device in accordance with this invention.
Figure 1B:
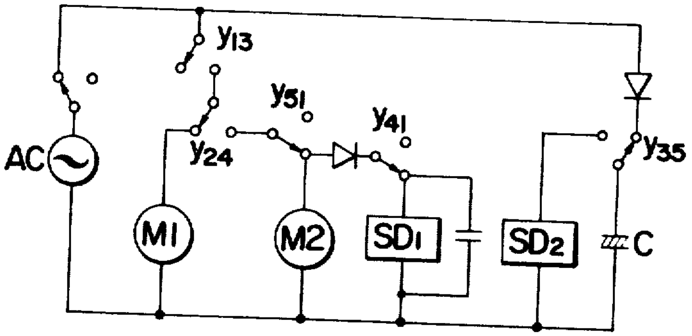

Referring to FIGS. 1*a* and 1*b*, reference symbol L represents the connecting terminals of an automatic telephone answering apparatus to a telephone circuit. 1 is a calling signal detecting circuit which detects an incoming calling signal and operates a timer circuit 2. T is a matching transformer to transmit and receive signals, and 3 is a signal amplifier. H1 is a magnetic reproducing head for reproducing an outgoing message signal previously recorded on an endless magnetic tape T1. H2 is a magnetic recording and reproducing head for recording an incoming message from a calling party on an incoming message recording tape T2 and for reproducing, during the remote control state, the incoming message signal recorded thereon. 4 is a remote control signal detecting circuit which receives only a predetermined remote control signal from a remote controller (a specific calling party) and then initiates the remote controlled operation. P1 and P2 are contact terminals which are short circuited by conductive foils C1 and C2 bonded to the answering tape T1 and to the beginning of the incoming message recording tape T2, respectively. M1 is an AC motor for driving the answering tape T1 and M2 is an AC motor for driving the tape T2. SD1 is a solenoid coil which, when energized, causes the recording tape T2 to run in the normal recording and reproducing direction and when deenergized, causes tape T2 to run in the rewinding direction. SD2 is a solenoid coil for resetting a mechanical tape length counter *Tc* to the "0000" position and C is a condenser for energizing the solenoid coil SD2 for a few seconds, Y1, Y2 . . . and Y5 are relays and contact $y_{12}$ is, for example, the second contact of the first relay Y1.

The tape length counter *Tc* counts the transported tape length of the incoming message recording tape T2 and has a contact yc which is in the position illustrated in FIG. 1, while the tape length counter *Tc* counts the transported tape length from its "0000" position in the adding direction, and which switches to the opposite position while the tape length counter *Tc* counts the rewound tape length from its "0000" position in decreasing direction and returns again from the end position of the rewinding to the "0000" position counting the tape length in adding direction. Thus, when the predetermined remote control signal is received, *Tc* is reset to the "0000" and *yc* is switched from the position illustrated simultaneously with the starting of the rewinding of the recording tape T2. While tape T2 is being rewound, *Tc* counts the tape length in decreasing direction as the tape moves in the reverse direction. After the predetermined remote control signal ceases, tape T2 reverses direction and is transported in the forward or normal direction toward the position it was in before the rewinding began. As the tape T2 is transported in the forward direction, counter *Tc* counts the length of the tape in the adding direction or toward its "0000" position. When *Tc* reaches the "0000" position, *yc* is switched back to the position illustrated, thereby deenergizing relay Y3.

Figure 2:
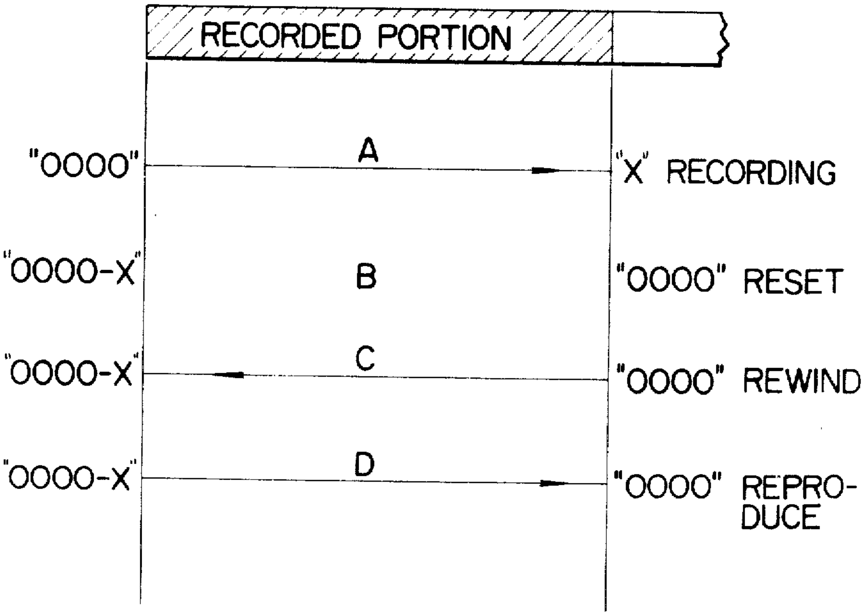
FIG. 2 illustrates the operation of an automatic telephone answering apparatus with the remote control device in accordance with this invention.

The general operation of the automatic telephone answering apparatus comprising the aforementioned structural elements will now be described below. When an incoming calling signal from a calling party reaches the connecting terminals L, the calling signal detecting circuit 1 detects it and then triggers the timer circuit 2, three to ten seconds later. Consequently, the relay Y1 is energized and thus the corresponding contacts $y_{11}$, $y_{12}$ and $y_{13}$ are switched to the opposite position of those illustrated in the figure. By switching of the contacts, the motor M1 starts to revolve and the answering tape T1 starts running in the normal reproducing direction. An answering message signal is reproduced by means of the reproducing head H1 and is sent out to the calling party through the contact $y_{21}$, the amplifier 3, the contact $y_{22}$, the matching transformer T and the contact $y_{11}$. When the answering tape T1, which is an endless tape, makes one revolution during which the answering message is sent out, the conductive foil C1, bonded to the tape T1, causes a short circuit across contact pieces P1 so as to energize the relay Y2, whereby the corresponding contacts $y_{21}$, $y_{22}$, $y_{23}$ and $y_{24}$ are switched. Accordingly, the motor M1 stops revolving, and motor M2 starts driving the incoming message recording tape T2. Solenoid coil SD1 is energized to drive the incoming message recording tape T2 in the normal recording direction. Consequently, an incoming message signal from the calling party is applied to the magnetic recording and reproducing head H2 via the matching transformer T, the contacts $y_{32}$ and $y_{21}$, the amplifier 3, and the contacts $y_{22}$ and $y_{33}$, and is recorded on the tape T2. During the recording operation, the tape length counter *Tc* continuously revolves in the adding direction in connection with the transported tape length as illustrated by line A in FIG. 2. When the incoming message from the calling party terminates and the timer circuit 2 returns to the original state, the relay Y1 is de-energized to change the corresponding contacts $y_{11}$, $y_{12}$ and $y_{13}$ to the position illustrated in the figure, whereby all the answering operation of the apparatus terminates and the apparatus returns to the standby state to wait for the next calling signal.

Next, the operation of the remote control device will be described in detail. By way of the same operation as mentioned above, the automatic telephone answering apparatus starts the answering operation by receiving a calling signal from a calling party which is a specific person, subscriber or owner. The device is changed to the incoming message recording operation state after the answering message has been reproduced and sent out. In the incoming message recording operation state, the relays Y1 and Y2 have been energized, and when the specific frequency remote control signal from the specific calling party is applied to the connecting terminals L, the remote control signal is applied to the remote control signal detecting circuit 4 through the matching transformer T. The detecting circuit 4 determines whether the applied signal is the predetermined remote control signal and if it is, energizes the relay Y3 by providing a ground connection within detecting circuit 4 via $y_{34}$ and the contact yc. The solenoid coil SD2 is energized by the switching of the contact $y_{35}$, and the tape length counter *Tc* is reset to the "0000" position shown at B in FIG. 2. Simultaneously, relay contact $y_{34}$ is switched, but the parallel capacitor across the relay coil Y3 momentarily latches relay coil Y3 so as to prevent its de-energization prior to the switching of contact *yc*. The relay Y4 is energized by the operation of the detecting circuit 4 through the switched contact $y_{34}$ so as to switch the corresponding contacts $y_{41}$ and $y_{42}$. By switching the contact $y_{41}$, the solenoid coil SD1 is released from the energizing state, and the apparatus is switched to the rewinding state to rewind the tape T2, and drive the tape length counter. The relay Y3 is continuously retained in the energized state by the switched contact yc of the tape length counter *Tc* instead of the detecting circuit 4. Contact *yc* was switched when tape length counter *Tc* was reset to the "0000" position and when rewinding of the tape T2, or reverse revolution of the *Tc* was started. While the specific calling party is sending out the remote control signal to his apparatus, the tape T2 continues to be rewound and thus the tape length counter continues to count, from "0000" position in decreasing direction, as shown at C in FIG. 2. When the specific calling party stops sending out the remote control signal after said signal has been sent out during a desired time period, the remote control signal detecting circuit 4 returns to the original state, and thus the relay Y4 is released from the energized state. Consequently, the solenoid coil SD1 is energized again, and the tape T2 is driven in the normal direction for reproducing and sending out the previously recorded incoming message signal. The previously recorded incoming message signal, picked up by means of the reproducing head H2, is sent out through the contacts $y_{32}$ and $y_{21}$, the amplifier 3, the contacts $y_{22}$ and $y_{23}$, and the matching transformer T. When the tape T2 reaches the starting point of the rewinding, or the "0000" position of the tape length counter *Tc*, all of the previously recorded incoming message signals have been reproduced and sent out as shown at D in FIG. 2. The contact *yc* of the tape length counter *Tc* then returns to the position illustrated in the figure because the counter is in the "0000" position, and the relay Y1 returns to the original state at the same time the relay Y3 is released from the energized state, whereby all of the answering operation of the apparatus terminates and the apparatus returns to the standby state to wait for the next calling signal. Further, to prevent the tape length counter *Tc* from going past the beginning of the tape T2 even if the remote control signal is continuously sent out longer than necessary, when the incoming message recording tape T2 is rewound to its beginning, the motor M2 stops revolving because of a conductive foil C2 bonded to the beginning of the tape T2. This foil causes a short circuit across the contact pieces P2 which energizes the relay Y5 via the contact $y_{42}$. When the specific calling party terminates the prolonged remote control signal, all of the previously recorded incoming messages are reproduced and sent out through the same operations as mentioned above, and the apparatus returns to the standby state to wait for the next calling signal.

In addition, in the remote control device of the aforementioned embodiment when the tape length counter is reset to the "0000" position by the operation of the remote control signal detecting circuit, the contact of the counter switches. This invention should not be, however, limited to this embodiment alone, for example, the remote control device may be used with a tape length counter having a contact which is set by the operation of the detecting circuit. The contact of the tape length counter switches at the position, where it has just been set.

The counter *Tc* with its associated switch contact *yc* is known per se. For example, Japanese patent publication number 8336/1954 published Dec. 17, 1954, describes a counter with a mechanically actuated switch contact used as a constant length measuring and automatic stopping device in a spinning process. The switch contact operates the instant the indicated number shifts from 0 to the largest to perform a control function. In addition, Japanese patent publication number 7428/72 published Mar. 2, 1972, discloses a similar counter and counter actuated switch contact used for automatically stopping the rewinding of a tape in a tape recorder.

Figure 3A:
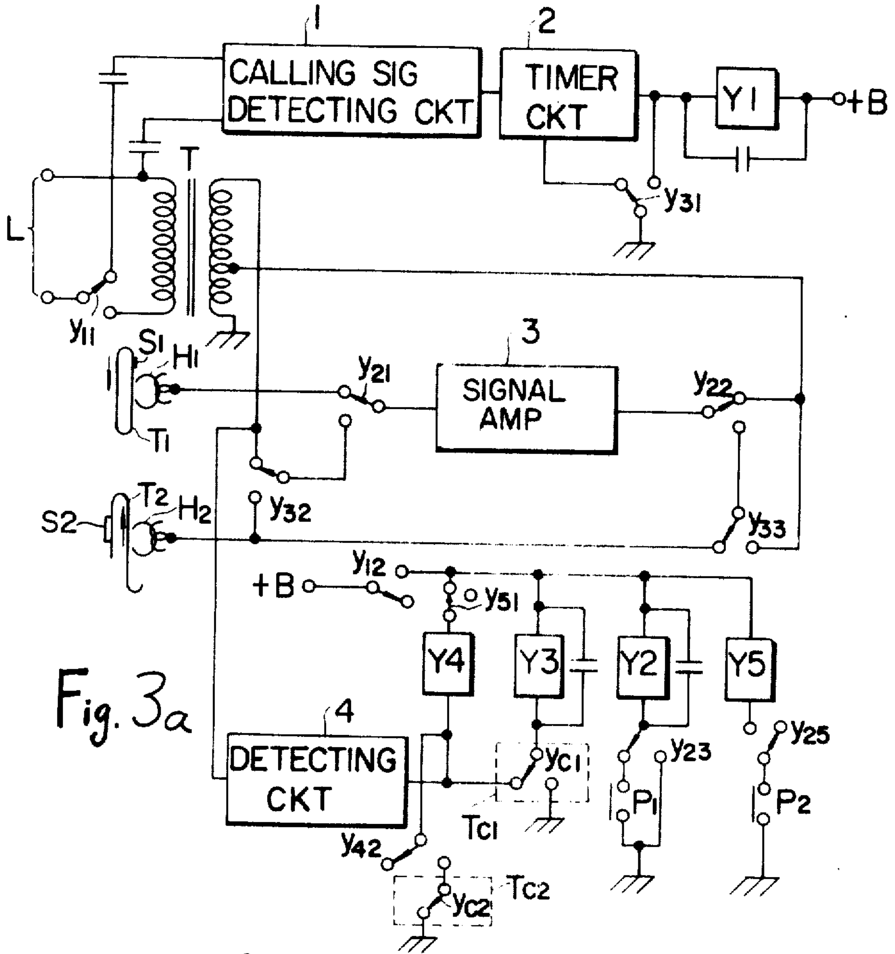
FIGS. 3*a* and 3*b* are schematic diagrams which, when taken together, illustrate another embodiment of the automatic telephone answering apparatus with remote control device in accordance with this invention.
Figure 3B:
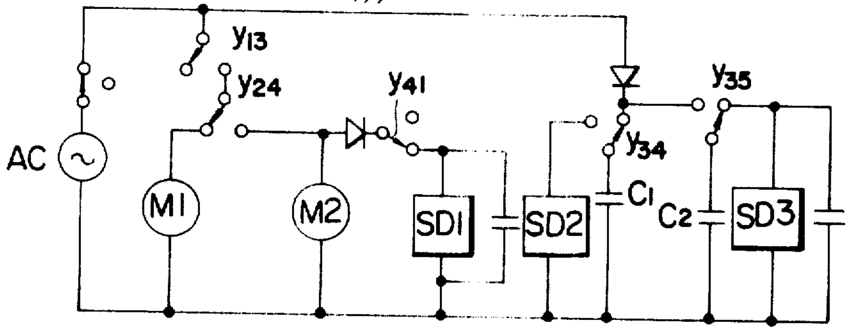

Another embodiment of the invention is shown in FIGS. 3*a* and 3*b* wherein like reference numerals designate corresponding or identical parts as shown in FIGS. 1*a* and 1*b*. The system includes a calling signal detecting circuit 1, a timer circuit 2, which, for example, may initiate a ten second sequence, an amplifier 3, a remote signal detection circuit 4, and a matching transformer T for transmitting and receiving signals. A pair of endless magnetic tapes T1 and T2 are provided. Tape T1 typically contains a previously recorded message, which, for example, informs any incoming caller that he is listening to a recording machine and that his message will be recorded. A reproducing head H1 is associated with tape T1 for reproducing the message on tape T1. Tape T2 is adapted to receive and record messages from incoming callers and to play back said messages via reproducing/recording head H2 associated therewith. This system also includes relays Y1 through Y5 which, when energized, cause a plurality of respective switches or contacts shown in FIGS. 3*a* and 3*b* to switch to positions opposite to that illustrated in the drawings. For example, relay Y1 controls switches y11 near the transformer T in FIG. 3*a*, *y*12 near the power supply source in FIG. 3*a*, and *y*13 near the AC source in FIG. 3*b*. Contact terminals P1 and P2 are both normally open and in series respectively with relays Y2 and Y5. The contact terminals P1 and P2 are short circuited by conductive foils S1 and S2 bonded to the answering tape T1 and to the beginning of the incoming message recording tape T2, respectively. Conductive foil S1 will close contacts P1 once during each complete revolution of tape T1. Conductive foil S2 bonded to tape T2 is positioned so that contacts P2 will be short circuited when tape T2 is at a start position corresponding to the beginning of the tape. A motor M1 shown in FIG. 3b causes tape T1 to rotate in the forward direction when energized. A motor M2 in combination with solenoid SD1 controls the rotation of tape T2. When M2 is not energized, tape T2 will not move. When M2 is energized, tape T2 will move in either the forward or reverse direction, depending upon whether solenoid SD1 is energized or de-energized, respectively.

The system includes a pair of memory means, for example, counters TC1 and TC2 illustrated generally by blocks in FIG. 3*a*. Although the exact type of memory used is not critical to the invention, one example comprises rotating counters which rotate with tape T2 in the forward and reverse direction whenever T2 rotates in the corresponding direction. The counters, for example, have reset positions corresponding to the count 0000. Counter TC1 may be reset by energizing solenoid SD2 shown in FIG. 3*b*, and counter TC2 may be reset by energizing solenoid SD3 shown in FIG. 3*b*. The resetting of either counter effectively stores the position of tape T2 at the time of reset in the respective counter. As the tape rotates away from the stored or reset position of the counter, the counter will effectively count forward or backwards depending upon the direction of movement of tape T2. Each of the counters is provided with a switch, *yc*1 and *yc*2, respectively, which is normally in the position illustated in FIG. 3*a*. When counter illustrated counts backwards from the 0000 position, switch *yc*1 switches to a ground position and remains in that position until counter TC1 comes back to the count of 0000 in the forward direction. Switch *yc*2 switches to an open position when counter TC2 passes through the position 0000 counting in a decreasing direction. *yc*2 goes back to its original position when TC2 comes bact to the count of 0000 in the forward direction.

The general operation of the automatic telephone apparatus comprising the aforementioned structural elements will now be described below. When an incoming calling signal from the calling party reaches the connecting terminals L, the calling signal detecting circuit 1 operates to initiate the timing circuit 2 which starts a timing sequence, e.g., for 10 seconds, and energizes relay Y1 for the timing period. When relay Y1 is energized, the corresponding contacts *y*11, *y*12 and *y*13 are switched to the opposite position of those illustrated in the figures. By switching the latter contacts, the motor M1 starts to revolve and the answering tape T1 starts running in the normal reproducing direction. An answering message signal is reproduced by means of reproducing head H1 and is sent out to the calling party via contact *y*21 and amplifier 3, contact *y*22, matching transformer T, contact *y*11 and terminals L. When the answering tape T1, which is an endless tape, makes one revolution during which the answering message is sent out, the conductive foil S1, bonded to the tape T1, causes a short circuit across terminals P1 so as to energize the relay Y2, whereby the corresponding contacts *y*21, *y*22, *y*23, *y*24 and *y*25 are switched. Accordingly, the motor M1 stops revolving, and the motor M2 starts driving the incoming message recording tape T2.

Since solenoid SD1 will also be energized at this time by the AC source via contacts *y*13, *y*24 and *y*41, the tape T2 will be driven in the forward direction, which is the normal recording direction. At this time, an incoming message signal from the caller will be applied to tape T2 and recorded via terminals L, switch y11, transformer T, contacts *y*32 and *y*21, amplifier 3, contacts *y*22 and *y*33, and recording head H2. During the recording operation, the tape length counters TC1 and TC2 continuously revolve together in the forward direction, which is the adding direction for the counters, in connection with the transported tape T2. At the end of the timing period set by timer circuit 2, relay Y1 will be de-energized and contacts *y*11, *y*12, and *y*13 will revert to their original positions illustrated in the drawings. This terminates the message recording operation of the apparatus and the apparatus returns to the standby state to wait for the next calling signal.

The sequence described above is repeated each time a caller phones in and records a message. Each reported message will be sequentially positioned on tape T2. When the owner or subscriber calls in, with the intention of obtaining playback of the recorded messages, the apparatus initially operates in the manner described above. In response to the call, the calling signal detecting circuit 1 and the timer circuit 2 operate to energize Y1. After T1 completes a revolution, Y2 is energized, and the apparatus is then in the position for recording incoming messages. However, the owner or subscriber emits a remote signal which may be a special frequency, which passes from terminals L via contact y11 and transformer T to the remote signal detection means 4. The latter circuit energizes relay Y3 via contact *yc*1 and energizes relay Y4 also.

At this point, a number of operations take place. The energization of relay Y4 causes contact *y*42 to switch position thereby holding Y4 energized via closed contact *y*42 and closed contact *yc*2. The energization of relay Y3 causes contact *y*34 in FIG. 3*b* to change positions allowing the charge on capacitor $C_1$ to discharge through and thereby energize solenoid SD2. The energization of solenoid SD2 resets counter TC1 to the 0000 position thereby effectively storing in counter TC1 the present position of the tape, which is also the position of the tape following the last recorded message. Contact *y*41 FIG. 3*b* also switches position so that solenoid SD1 will not be energized. The energization of motor M2 via contacts *y*13 and *y*24 and the absence of energization of solenoid SD1 causes tape T2 to move in the reverse direction. Since both of the counters revolve with the movement of tape T2, counter TC1 is effectively counting down from its reset or 0000 position. This causes contact *yc*1 to change position and hold relay Y3 energized. Tape T2 continues movement in the reverse direction until counter TC2 counts down to 0000. The latter position of counter TC2, as will appear more clearly hereafter, corresponds to the position of the tape following the end of the previous playback sequence.

When counter TC2 reaches the 0000 position and then passes through it, contact *yc*2 opens thereby causing relay Y4 to be de-energized. The de-energization of relay Y4 causes contact *y*41 to switch to its normal position, as shown in FIG. 3*b*, thereby energizing solenoid SD1 and causing tape T2 to begin rotating in the forward direction. This allows the messages recorded on tape T2 subsequent to the last call in by the owner or subscriber to be reproduced and played back for the owner or subscriber. As the tape moves forward the messages are reproduced and sent to the owner or subscriber via reproducing head H2, contact *y*32, contact *y*21, amplifier 3, contact *y*22, contact *y*33, transformer T, contact *y*11 and terminals L. As the tape is moving forward, both counters TC1 and TC2 begin counting again in the forward direction. When counter TC1 reaches the 0000 position, which corresponds to the end of the last recorded message, contact *yc*1 will switch back to its normal position, as shown in FIG. 3*a*, and relay Y3 will become de-energized. At this point, a number of events occur. Contact *y*31 switches back to its normal position thereby causing relay Y1 to de-energize. The de-energization of relay Y1 opens contact *y*13 in FIG. 3*b* thereby removing energy from motor M2 and stopping the forward motion of tape T2. The de-energization of relay Y3 also causes contact *y*35, in FIG. 3*b*, to switch from a position which allows charging of capacitor $C_2$ to its normal position as indicated in the drawing. When contact *y*35 switches back to its normal position, the charge on capacitor $C_2$ discharges through solenoid SD3 which operates to reset counter TC2 to the 0000 position. Thus, counter $T_2$ now effectively stores the position of the tape which corresponds to the end of the just finished playback sequence for the owner or subscriber. Thus, the next time the owner or subscriber calls in and emits the proper remote signal, the tape will be moved in the reverse direction in the manner described above and stopped by counter TC2 and switch yc2 when the tape reaches the position corresponding to the just finished playback sequence position. As is apparent from the above description, the apparatus allows the owner or subscriber to call in and listen to playback of only those messages which have been recorded subsequent to the last time the owner or subscriber called in and initiated a playback sequence. The relay Y5 aand associated contacts are provided to prevent tape T2 from going past its start position even if contact *yc*2 fails to open and thereby fails to stop the reverse movement of the tape. Assuming *yc*2 fails to open, the tape will continue moving in the reverse direction. When the tape reaches its start position, conductive foil S2 bonded thereto short circuits terminals P2 thereby energizing relay Y5. It will be noted that at this time contacts *y*12 and *y*25 will be closed due to the prior energization of relays Y1 and Y2. The energization of relay Y5 causes contact *y*51 to open which in turn causes relay Y4 to de-energize. The de-energization of relay y4 causes contact *y*41 to switch to its original position which in turn stops the reverse movement of tape T2 and starts the forward movement of tape T2.

As was explained in detail hereinabove, the present invention has many advantages as summarized below.

First, the remote control signal detecting circuit applied to the remote control device of this invention directly receives a remote control signal transmitted by a specific calling party by way of a telephone circuit and determines whether the incoming signal is a predetermined remote control signal; consequently, the remote control device insures operation without any interference from voice signals, noise signals and the like.

Second, a switch is operated at "0000" position of the tape length counter which is the point at which rewinding begins. In other words, the tape length counter stores the position of the tape at which rewinding begins so the automatic telephone answering apparatus returns to the standby state only after all of the incoming message signals have been sent out.

Third, the tape length counter does not require an indicating means for indicating the transported tape length, however, an indicating means is preferable.

Although in the preferred embodiments described, counters which revolve with the recording tape T2 are suggested as a preferred embodiment, it will be apparent that other types of memories could be used. Furthermore, the contacts associated with counters TC1 and TC2 could be switched in response to the remote signal directly.

While the invention has been particularly shown and described with reference to the preferred embodiment thereof, it will be understood by those skilled in the art that various changes in form and details may be made therein without departing from the spirit and scope of the invention.

I claim:

1. A remote control device for use with an automatic telephone answering apparatus, including a tape transport mechanism having a magnetic recording tape and a record/playback head for playing back previously recorded messages, said device comprising:

a. a remote control signal detecting means coupled to said answering apparatus for detecting a predetermined control signal, b. counter means driven by said tape transport mechanism to count in a forward direction when said tape is advanced during either recording or playback modes and to count in a decreasing direction when said tape is reversed in a rewind mode, c. reset means controlled by the initiation of said control signal detected by said detecting means for resetting said counter means to a predetermined initial count, d. mode control means operable in response to the detection of said control signal by said detecting means for putting said tape transport mechanism in a rewind mode and to put said tape transport mechanism in a playback mode, and e. switch means in said counter means and actuated by said counter means when said counter means returns to said predetermined initial count during the playback mode for returning said answering apparatus to a standby state.

2. A remote control device for use in an automatic telephone apparatus as claimed in claim 1, wherein the switch means of said counter means switches when said counter means passes through the predetermined count and returns to the original state when reaching the predetermined count during the playback operation.

3. A remote control device for use with an automatic telephone answering apparatus as claimed in claim 1, wherein said mode control means is operable during the time said control signal is detected to put said tape transport mechanism in a rewind mode and, on the cessation of said control signal, to put said tape transport mechanism in a playback mode.

4. A remote control device for use with an automatic telephone answering apparatus as claimed in claim 3, further comprising detecting means for detecting the beginning of said recording tape when said tape transport mechanism is in a rewind mode to stop any further rewinding of said recording tape.

5. A remote control device for use with an automatic telephone apparatus as claimed in claim 1, wherein said mode control means comprises:

a. second counter means driven by said tape transport mechanism to count in a forward direction when said tape is advanced during either recording or playback modes and to count in a decreasing direction when said tape is reversed in a rewind mode, and b. means responsive to said reverse movement of said tape and to said second counter means for stopping said reverse movement and starting forward movement of said tape when said tape reaches a predetermined reference position.

6. A remote control device for use with an automatic telephone apparatus as claimed in claim 5, further comprising second reset means responsive to said switch means in said first counter means for resetting said second counter means to a new predetermined reference position when said first counter reaches said predetermined initial count.

7. A remote control device for use with an automatic telephone apparatus as claimed in claim 6, wherein said means responsive to said reverse movement and said second counter means includes second switch means in said second counter means, and said second switch means is actuated by said second counter means when said second counter means passes through said predetermined reference position.

8. In an automatic telephone answering apparatus of the type which includes a recording tape means for recording incoming messages, the improvement comprising:

a. a first counter means adapted to store the position of said recording tape relative to a first counter means reference position which can be set in said first counter means, b. means responsive to a remote signal for setting the present position of said tape in said first counter means as said first counter means reference position and for initiating reverse movement of said tape, c. second counter means adapted to store the position of said recording tape relative to a second counter means reference position which can be set in said second counter means, d. means responsive to the reverse movement of said tape and to said second counter means for stopping said reverse movement and starting forward movement of said tape when said tape reaches a position corresponding to said second counter means reference position in said second counter means, e. means for reproducing the recorded messages as said tape moves forward, f. means responsive to the forward movement of said tape and to said first counter means for stopping the forward movement of said tape when said tape reaches a position corresponding to the first counter means reference position in said first counter means, and g. means responsive to said tape reaching said last mentioned position, for storing said last mentioned tape position in said second counter means as said second counter means reference position.

9. An automatic telephone answering apparatus as claimed in claim 8 wherein at least one of said first and second counter means includes an indicator means for indicating the position of said tape relative to the reference position set in said at least one counter means.

10. An automatic telephone answering apparatus as claimed in claim 8 wherein said means responsive to a remote signal comprises:

a. tape movement control means for causing movement of said recording tape, b. tape direction control means for controlling direction of movement of said recording tape, said tape direction control means comprising a first switching means having first and second position for controlling said direction of movement in the forward and reverse directions, respectively, said first switching means normally being in said first position, c. first switch control means for causing said first switching means to switch to said second position when said first switch control means is energized, and d. remote signal detecting means responsive to said remote signal for energizing said first switch control means whereby said recording tape is caused to move in said reverse direction.

11. An automatic telephone answering apparatus as claimed in claim 10 wherein said means responsive to a remote signal further comprises:

a. first resetting means for resetting said first counter means to said first counter means reference position when said first resetting means is energized, b. second switching means having first and second positions whereby said first resetting means is energized when said second switching means is actuated to switch from said first to said second position, c. second switch control means for actuating said second switching means when said second switch control means is energized, said second switch control means being connected to said remote signal detecting means and energized when said detecting means detects said remote signal.

12. An automatic telephone answering apparatus as claimed in claim 11 wherein said means, responsive to the reverse movement of said tape and to said second counter means for stopping said reverse movement and starting forward movement, comprises third switch means associated with said second counter means adapted to remove energization of said first switch control means when said second counter means reaches a count corresponding to said second counter means reference position set therein, whereby the de-energization of said first switch control means causes said first switching means to revert back to said first position thereby terminating the reverse movement of said recording tape.

13. An automatic telephone answering system as claimed in claim 12 wherein said means for storing said last mentioned position in said second counter means comprises:

a. second resetting means for resetting said second counter means to said second counter means reference position when said second resetting means is energized, b. fourth switching means responsive to the de-energization of said second switch control means to move from a second to a first position, the latter position connecting said second resetting means to a source of energy to thereby energize said second resetting means, and c. fifth switch means associated with said first counter means adapted to remove energization of said second switch control means when said first counter means reaches a count corresponding to said first counter means reference position, whereby the de-energization of said second switch control means causes said fourth switching means to move from its second to its first position to energize said second resetting means which resets said second counter to said second counter means reference position.

14. An automatic telephone answering apparatus as claimed in claim 13 wherein at least one of said first and second counter means includes an indicator means for indicating the position of said tape relative to the reference position set in said at least one counter means.

* * * * *